(12) United States Patent
Kinoshita et al.

(10) Patent No.: US 10,807,173 B2
(45) Date of Patent: Oct. 20, 2020

(54) CUTTING INSERT AND MILLING TOOL

(71) Applicant: SUMITOMO ELECTRIC HARDMETAL CORP., Itami-shi (JP)

(72) Inventors: Keiji Kinoshita, Itami (JP); Kouki Matsubara, Itami (JP); Yusuke Koike, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 161 days.

(21) Appl. No.: 16/312,408

(22) PCT Filed: May 15, 2018

(86) PCT No.: PCT/JP2018/018716
§ 371 (c)(1),
(2) Date: Dec. 21, 2018

(87) PCT Pub. No.: WO2019/220528
PCT Pub. Date: Nov. 21, 2019

(65) Prior Publication Data
US 2019/0351493 A1 Nov. 21, 2019

(51) Int. Cl.
*B23B 5/22* (2006.01)
*B23B 5/28* (2006.01)
(Continued)

(52) U.S. Cl.
CPC .......... *B23C 5/2226* (2013.01); *B23C 5/2403* (2013.01); *B23C 5/28* (2013.01); *B23C 5/18* (2013.01)

(58) Field of Classification Search
CPC .......... B23C 5/06; B23C 5/1018; B23C 5/20; B23C 5/22; B23C 5/28; B23C 5/2204;
(Continued)

(56) References Cited

U.S. PATENT DOCUMENTS

| | | | |
|---|---|---|---|
| 2008/0240872 A1* | 10/2008 | Rimet | B23D 77/042 407/51 |
| 2010/0239377 A1* | 9/2010 | Morrison | B23C 5/1045 407/11 |

(Continued)

FOREIGN PATENT DOCUMENTS

| | | | |
|---|---|---|---|
| CA | 2601783 A1 | 11/2006 | |
| DE | 102013105206 A1 * | 11/2014 | B23C 5/28 |

(Continued)

*Primary Examiner* — Nicole N Ramos
(74) *Attorney, Agent, or Firm* — Baker Botts L.L.P.; Michael A. Sartori (57) ABSTRACT

A second distance is longer than a first distance and a value obtained by dividing the third distance by the fourth distance is more than or equal to 0.5 and less than or equal to 0.8 when it is assumed that the first distance represents a distance between the cutting edge and the mounting surface in a direction perpendicular to the rake face, the second distance represents a distance between the mounting surface and a boundary portion between the rising portion and the flat portion in the direction perpendicular to the rake face, the third distance represents a distance between the boundary portion and a tip of the cutting edge in a direction parallel to the rake face, and the fourth distance represents a distance between the second discharging opening portion and the tip of the cutting edge in the direction parallel to the rake face.

13 Claims, 7 Drawing Sheets

(51) Int. Cl.
*B23C 5/22* (2006.01)
*B23C 5/24* (2006.01)
*B23C 5/28* (2006.01)
*B23C 5/18* (2006.01)

(58) Field of Classification Search
CPC ... B23C 5/2217; B23C 5/2226; B23C 5/2252; B23C 5/2403; B23C 5/2472; B23C 2200/367; B23C 2210/168
See application file for complete search history.

(56) References Cited

U.S. PATENT DOCUMENTS

| | | | | |
|---|---|---|---|---|
| 2013/0309025 A1* | 11/2013 | Zimmermann | ......... | B23C 5/207 407/11 |
| 2014/0003872 A1* | 1/2014 | Kovac | ....................... | B23C 5/22 407/11 |
| 2016/0158855 A1* | 6/2016 | Kondameedi | ........... | B23C 5/207 407/11 |
| 2019/0118272 A1* | 4/2019 | Shibuya | .................. | B23C 5/207 |

FOREIGN PATENT DOCUMENTS

| EP | 1883487 A1 | | 2/2008 | |
|---|---|---|---|---|
| EP | 2962796 A1 | * | 1/2016 | ........... B23D 77/006 |
| EP | 3135410 A1 | * | 3/2017 | ....... B23B 29/03407 |
| JP | 2015-047693 A | | 3/2015 | |
| WO | 2015/016144 A1 | | 2/2015 | |

\* cited by examiner

CUTTING INSERT AND MILLING TOOL

TECHNICAL FIELD

The present invention relates to a cutting insert and a milling tool.

BACKGROUND ART

Conventionally, a milling tool described in Japanese Patent Laying-Open No. 2015-47693 (Patent Literature 1) has been known. The milling tool described in Patent Literature 1 has a tool body and a cassette. The cassette is attached to the tool body. The cassette has a cutting insert and a fastening component. The cutting insert is attached to the fastening component. A coolant passage is provided to open in a swarf guide surface of the fastening component.

CITATION LIST

Patent Literature

PTL 1: Japanese Patent Laying-Open No. 2015-47693

SUMMARY OF INVENTION

A cutting insert according to one embodiment of the present invention includes a cutting edge member and a mounting portion. On the mounting portion, the cutting edge member is mounted. The cutting edge member includes a rake face and a flank face continuous to the rake face. A ridgeline between the rake face and the flank face constitutes a cutting edge. The mounting portion includes a mounting surface on which the cutting edge member is mounted, a first side surface continuous to the mounting surface, and a second side surface opposite to the first side surface. The mounting portion is provided with a coolant supplying passage that opens in each of the first side surface and the second side surface. An opening of the coolant supplying passage in the first side surface constitutes a discharging opening of the coolant supplying passage. An opening of the coolant supplying passage in the second side surface constitutes an introduction opening of the coolant supplying passage. The first side surface is provided with a step constituted of a rising portion and a flat portion continuous to the rising portion. When it is assumed that a first cross section represents a cross section that is perpendicular to the rake face and that crosses each of the introduction opening and the discharging opening, the discharging opening has a first discharging opening portion and a second discharging opening portion in the first cross section, the second discharging opening portion being located between the first discharging opening portion and a straight line extending along the mounting surface. A second distance is longer than a first distance and a value obtained by dividing a third distance by a fourth distance is more than or equal to 0.5 and less than or equal to 0.8 when it is assumed that the first distance represents a distance between the cutting edge and the mounting surface in a direction perpendicular to the rake face, the second distance represents a distance between the mounting surface and a boundary portion between the rising portion and the flat portion in the direction perpendicular to the rake face, the third distance represents a distance between the boundary portion and a tip of the cutting edge in a direction parallel to the rake face, and the fourth distance represents a distance between the second discharging opening portion and the tip of the cutting edge in the direction parallel to the rake face.

DETAILED DESCRIPTION

Problems to be Solved by the Present Disclosure

In the milling tool described in Japanese Patent Laying-Open No. 2015-47693, swarf from a workpiece cut by a cutting edge is moved toward the swarf guide surface. The coolant supplying passage is provided to open in the swarf guide surface. Accordingly, in the above-described milling tool, the coolant supplying passage may be blocked by the swarf.

One embodiment of the present invention has been made in view of the above-described problem, and has an object to provide a cutting insert and a milling tool, by each of which a coolant supplying passage can be suppressed from being blocked by swarf.

Advantageous Effect of the Present Disclosure

According to a cutting insert and a milling tool according to one embodiment of the present invention, a coolant supplying passage can be suppressed from being blocked by swarf.

[Description of Embodiments]

First, the following describes a summary of embodiments of the present invention.

(1) A cutting insert 10 according to one embodiment of the present invention includes a cutting edge member 20 and a mounting portion 30. On mounting portion 30, cutting edge member 20 is mounted. Cutting edge member 20 includes a rake face 22 and a flank face 23 continuous to rake face 22. A ridgeline between rake face 22 and flank face 23 constitutes a cutting edge 21. Mounting portion 30 includes a mounting surface 37 on which cutting edge member 20 is mounted, a first side surface 31 continuous to mounting surface 37, and a second side surface 32 opposite to first side surface 31. Mounting portion 30 is provided with a coolant supplying passage 40 that opens in each of first side surface 31 and second side surface 32. An opening of coolant supplying passage 40 in first side surface 31 constitutes a discharging opening 41 of coolant supplying passage 40. An opening of coolant supplying passage 40 in second side surface 32 constitutes an introduction opening 42 of coolant supplying passage 40. First side surface 31 is provided with a step ST constituted of a rising portion 31b and a flat portion 31d continuous to rising portion 31b. When it is assumed that a first cross section represents a cross section that is perpendicular to rake face 22 and that crosses each of introduction opening 42 and discharging opening 41, discharging opening 41 has a first discharging opening portion 41d and a second discharging opening portion 41c in the first cross section, second discharging opening portion 41c being located between first discharging opening portion 41d and a straight line extending along mounting surface 37. A second distance D2 is longer than a first distance D1 and a value obtained by dividing a third distance D3 by a fourth distance D4 is more than or equal to 0.5 and less than or equal to 0.8 when it is assumed that first distance D1 represents a distance between cutting edge 21 and mounting surface 37 in a direction perpendicular to rake face 22, second distance D2 represents a distance between mounting surface 37 and a boundary portion 31c between rising portion 31b and flat portion 31d in the direction perpendicular to rake face 22, third distance D3 represents a distance between boundary portion 31c and a tip 21f of cutting edge 21 in a direction parallel to rake face 22, and fourth distance D4 represents a distance between second discharging opening portion 41c and tip 21f of cutting edge 21 in the direction parallel to rake face 22.

In cutting insert 10 according to (1), second distance D2 is longer than first distance D1 when it is assumed that first distance D1 represents a distance between cutting edge 21 and mounting surface 37 in the direction perpendicular to rake face 22 and second distance D2 represents a distance between mounting surface 37 and boundary portion 31c between rising portion 31b and flat portion 31d in the direction perpendicular to rake face 22. Accordingly, boundary portion 31c between rising portion 31b and flat portion 31d is disposed at a location higher than rake face 22. Therefore, the direction of the swarf, which moves along rake face 22, is changed by step ST constituted of rising portion 31b and flat portion 31d such that the swarf passes through the location higher than rake face 22. Therefore, the swarf can be suppressed from moving toward coolant supplying passage 40. Therefore, coolant supplying passage 40 can be suppressed from being blocked by the swarf.

Moreover, the value obtained by dividing third distance D3 by fourth distance D4 is more than or equal to 0.5 and less than or equal to 0.8 when it is assumed that third distance D3 represents a distance between boundary portion 31c and tip 21f of cutting edge 21 in a direction parallel to rake face 22 and fourth distance D4 represents a distance between second discharging opening portion 41c and tip 21f of cutting edge 21 in the direction parallel to rake face 22. Accordingly, the swarf is drawn to near first side surface 31 and the direction of the swarf is then changed by step ST constituted of rising portion 31b and flat portion 31d. Therefore, the swarf can be curled readily by first side surface 31. As a result, the swarf can be divided effectively.

(2) According to cutting insert 10 according to (1), in the first cross section, boundary portion 31c may be located between a straight line passing through second discharging opening portion 41c and tip 21f of cutting edge 21 and a straight line extending along mounting surface 37.

(3) In cutting insert 10 according to (1) or (2), a value obtained by subtracting first distance D1 from second distance D2 may be more than or equal to 0.1 mm and less than or equal to 0.3 mm.

(4) According to cutting insert 10 according to any one of (1) to (3), in the first cross section, first discharging opening portion 41d may be located between a straight line extending along rising portion 31b and a straight line extending along mounting surface 37. Accordingly, the direction of the swarf is changed such that the swarf moves to above first discharging opening portion 41d. Accordingly, the swarf can be suppressed from entering coolant supplying passage 40. Therefore, coolant supplying passage 40 can be further suppressed from being blocked by the swarf.

(5) According to cutting insert 10 according to any one of (1) to (4), in the first cross section, first side surface 31 may have a curvature portion 31f continuous to flat portion 31d. Accordingly, the swarf can be curled effectively and readily. As a result, the swarf can be divided effectively.

(6) According to cutting insert 10 according to (5), in the first cross section, a fifth distance D5 may be longer than fourth distance D4 when it is assumed that fifth distance D5 represents a distance between first discharging opening portion 41d and tip 21f of cutting edge 21 in the direction parallel to rake face 22.

(7) According to cutting insert 10 according to (6), in the first cross section, curvature portion 31f may have a first end portion 31e continuous to flat portion 31d and a second end portion 31g opposite to first end portion 31e, and a sixth distance D6 may be shorter than fifth distance D5 when it is assumed that sixth distance D6 represents a distance between second end portion 31g and tip 21f of cutting edge 21 in the direction parallel to rake face 22. Accordingly, the swarf can be curled more effectively. As a result, the swarf can be divided more effectively. Moreover, the swarf can be suppressed from coming into contact with the body.

(8) In cutting insert 10 according to any one of (1) to (7), cutting edge 21 may have a first cutting edge portion 21a, a corner cutting edge portion 21c continuous to first cutting edge portion 21a, and a second cutting edge portion 21b continuous to corner cutting edge portion 21c. A boundary between first cutting edge portion 21a and corner cutting edge portion 21c may constitute a first corner portion 21d. A boundary between second cutting edge portion 21b and corner cutting edge portion 21c may constitute a second corner portion 21e. When it is assumed that a second cross section represents a cross section parallel to rake face 22, in the second cross section, coolant supplying passage 40 may have a first side end portion 41a and a second side end portion 41b opposite to first side end portion 41a, and each of first corner portion 21d and second corner portion 21e may be located between a straight line extending along first side end portion 41a and a straight line extending along second side end portion 41b. Accordingly, the coolant can be supplied effectively to the vicinity of corner cutting edge portion 21c. As a result, the swarf can be suppressed from being caught in the workpiece while dividing the swarf effectively.

(9) In cutting insert 10 according to (8), a width of discharging opening 41 in the direction parallel to rake face 22 may be larger than a width of discharging opening 41 in the direction perpendicular to rake face 22. Accordingly, cutting edge 21 can be cooled in a wide range.

(10) A milling tool according to one embodiment of the present invention includes: cutting insert 10 recited in any one of (1) to (9); and a body 60 to which cutting insert 10 is attached. A coolant supplying portion 90 continuous to introduction opening 42 is provided in body 60.

(11) In the milling tool according to (10), coolant supplying passage 40 may be constituted of a coolant reservoir portion 44 and an ejection passage 43, coolant reservoir portion 44 being continuous to introduction opening 42, ejection passage 43 being continuous to each of coolant reservoir portion 44 and discharging opening 41. A cross sectional area of coolant supplying portion 90 may be smaller than a maximum cross sectional area of coolant reservoir portion 44 and may be larger than a cross sectional area of ejection passage 43. Since the cross sectional area of coolant supplying portion 90 is made smaller than the maximum cross sectional area of coolant reservoir portion 44, coolant supplying portion 90 of body 60 is covered by coolant supplying passage 40 of cutting insert 10 even in the case where the cutting edge of cutting insert 10 is shifted forward relative to body 60 when the cutting edge of cutting insert 10 is worn, whereby the coolant can be supplied from body 60 to coolant supplying passage 40 of cutting insert 10. Moreover, by making the cross sectional area of ejection passage 43 smaller than the maximum cross sectional area of coolant reservoir portion 44, the coolant can be exactly supplied to the cutting edge even during high-speed rotation. Moreover, the effect of dividing the swarf can be improved. Further, even with a small amount of supply of coolant, the coolant can be supplied to the cutting edge at a high pressure.

(12) In the milling tool according to (11), a cross sectional area of ejection passage 43 may be less than or equal to 1 $mm^2$. Accordingly, the coolant can be supplied to the cutting edge at a higher pressure.

(13) In the milling tool according to (11) or (12), rake face 22 may be parallel to an extending direction of ejection passage 43.

[Details of Embodiments of the Present Invention]

Next, details of the embodiments of the present invention will be described with reference to figures. It should be noted that the same or corresponding portions in the figures are given the same reference characters. Moreover, at least a part of the embodiments described below may be appropriately combined.

(Configuration of Milling Tool)

Figure 1:
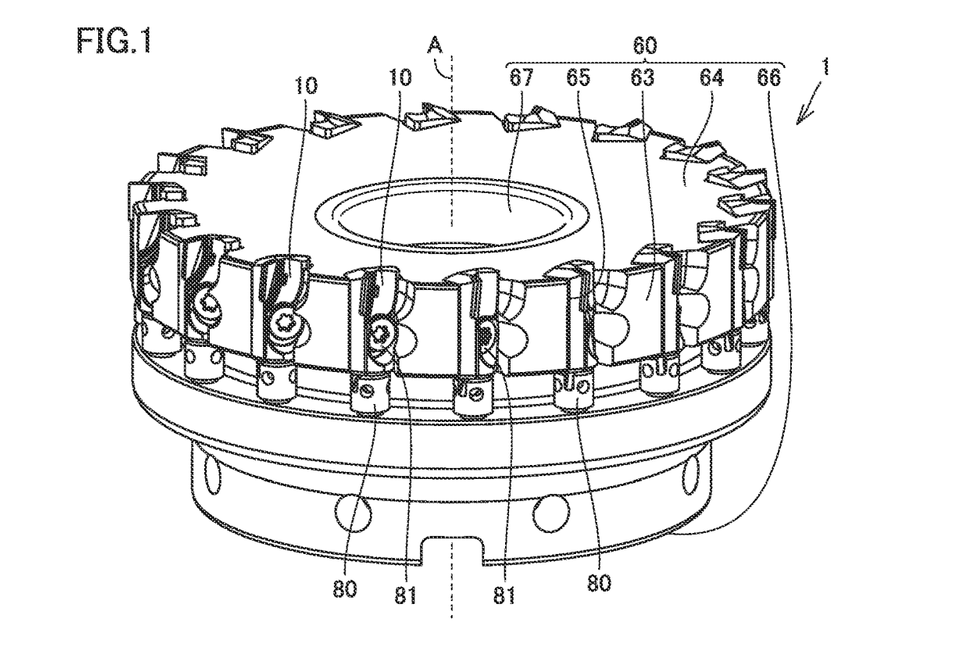
FIG. 1 is a schematic perspective view showing a configuration of a milling tool according to the present embodiment.

First, a configuration of a milling tool 1 according to the present embodiment will be described. FIG. 1 is a schematic perspective view showing the configuration of milling tool 1 according to the present embodiment.

As shown in FIG. 1, milling tool 1 according to the present embodiment mainly has a body 60, cutting inserts 10, fastening screws 81, and adjustment screws 80. Body 60 has an outer circumferential surface 63, an insert attachment portion 65, a first end 64, and a second end 66. Outer circumferential surface 63 is provided to surround a center axis A of body 60. Insert attachment portion 65 is provided on outer circumferential surface 63. A plurality of insert attachment portions 65 may be provided on outer circumferential surface 63. Each of insert attachment portions 65 is depressed toward the center axis A side with respect to outer circumferential surface 63.

Each of first end 64 and second end 66 is an end of body 60 in a direction along center axis A. Second end 66 is an end of body 60 located at a side attached to a main shaft of the machine tool. First end 64 is an end opposite to second end 66. Outer circumferential surface 63 is continuous to first end 64. A through hole 67 which opens in each of the first end and the second end is provided in body 60. Body 60 is composed of steel, for example. The diameter of body 60 is 100 mm, for example. A workpiece is an aluminum alloy (ADC 12) or the like, for example.

Cutting inserts 10 are disposed at respective insert attachment portions 65 provided in body 60. Each of insert attachment portions 65 is attached to body 60 by a fastening screw 81. This leads to a minimized deformation amount of body 60 and simplified adjustment of runout of the cutting edge. The plurality of cutting inserts 10 are provided in a circumferential direction of body 60. Four or more cutting inserts 10 may be disposed per diameter of 1 inch (2.54 cm), i.e., a diameter of an envelope circle of the cutting edge centered on center axis A of body 60. Adjustment screws 80 are provided in contact with cutting inserts 10. Each of adjustment screws 80 is located between cutting insert 10 and the second end in a direction parallel to center axis A. Adjustment screw 80 is configured to adjust the location of cutting insert 10 in the direction parallel to center axis A.

(Configuration of Cutting Insert)

Figure 2:
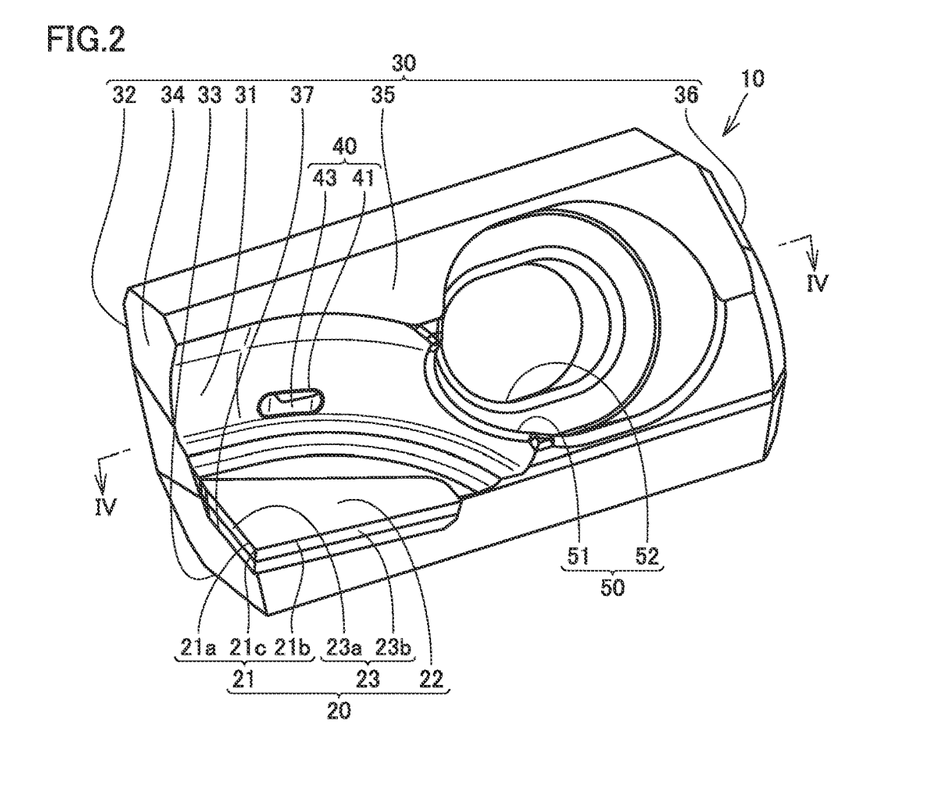
FIG. 2 is a schematic perspective view when a cutting insert according to the present embodiment is viewed from the first side surface side.
Figure 3:
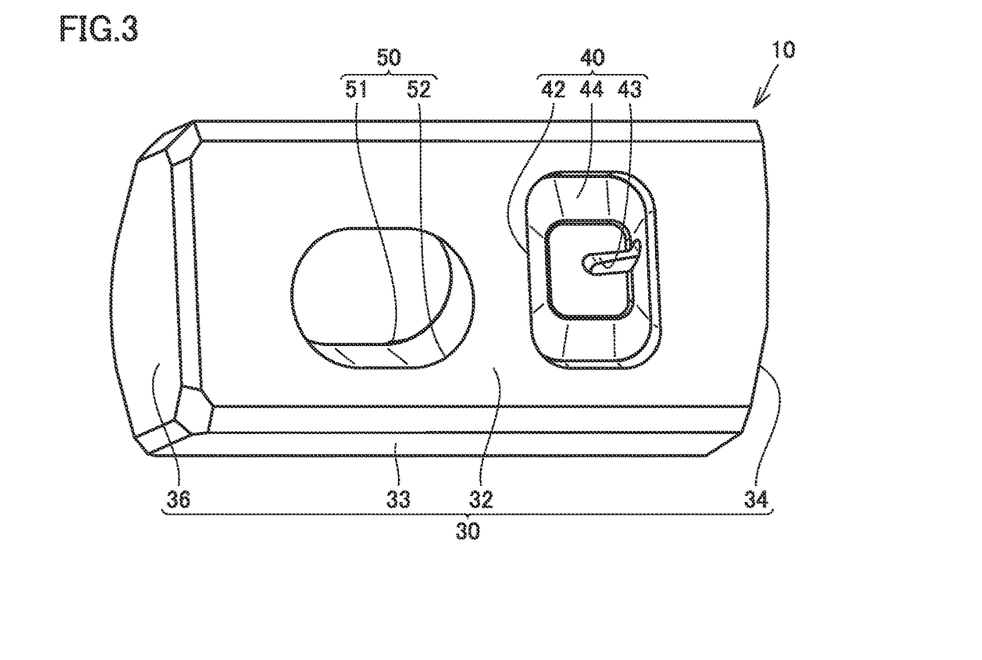
FIG. 3 is a schematic perspective view when the cutting insert according to the present embodiment is viewed from the second side surface side.
Figure 4:
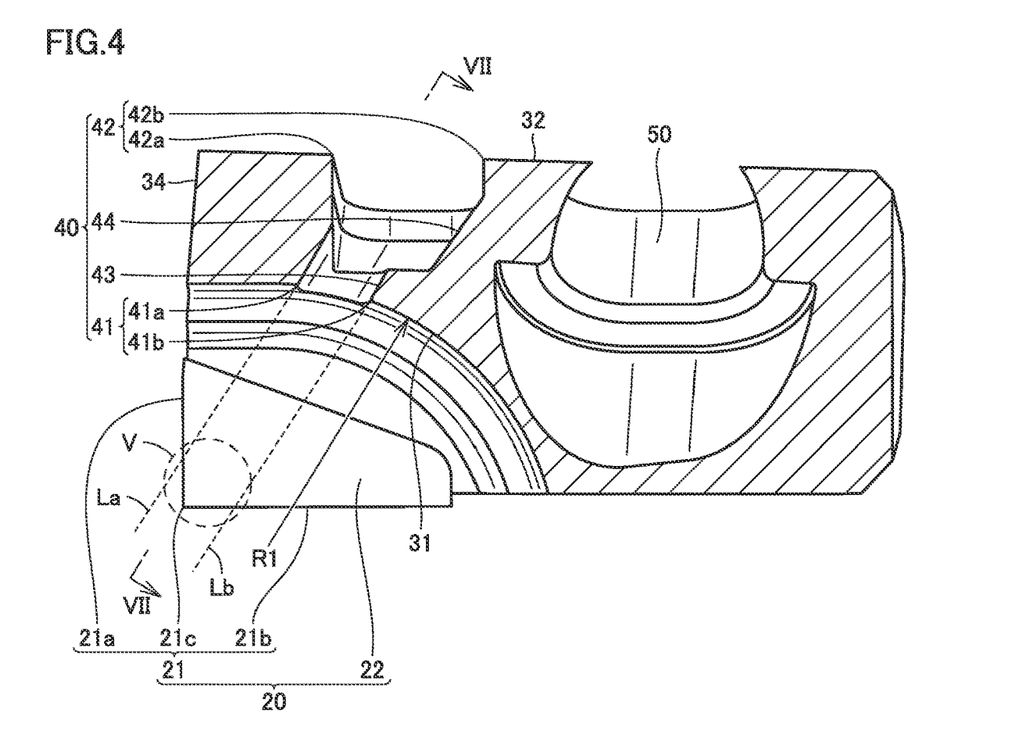
FIG. 4 is a schematic cross sectional view taken along a IV-IV line of FIG. 2.

Next, the following describes a configuration of cutting insert 10 according to the present embodiment. FIG. 2 is a schematic perspective view when cutting insert 10 according to the present embodiment is viewed from the first side surface 31 side. FIG. 3 is a schematic perspective view when cutting insert 10 according to the present embodiment is viewed from the second side surface 32 side. FIG. 4 is a schematic cross sectional view taken along a IV-IV line of FIG. 2.

As shown in FIG. 2, cutting insert 10 has a cutting edge member 20 and a mounting portion 30. Cutting edge member 20 has a rake face 22 and a flank face 23. Flank face 23 is continuous to rake face 22. A ridgeline between rake face 22 and flank face 23 constitutes cutting edge 21. Flank face 23 has a first flank face portion 23a and a second flank face portion 23b. A ridgeline between first flank face portion 23a and rake face 22 constitutes a first cutting edge portion 21a. A ridgeline between second flank face portion 23b and rake face 22 constitutes a second cutting edge portion 21b. Cutting edge member 20 is attached to mounting portion 30 by brazing, for example. Cutting edge member 20 is composed of a sintered material including polycrystalline diamond (PCD), for example. Cutting edge member 20 has a flat-plate shape. Cutting edge member 20 may be composed of a sintered material including cubic boron nitride (CBN), for example.

Cutting edge member 20 is mounted on mounting portion 30. Cutting edge member 20 is in contact with mounting portion 30. As shown in FIG. 2 and FIG. 3, mounting portion 30 mainly has a mounting surface 37, a first side surface 31, a second side surface 32, a third side surface 34, a fourth side surface 36, a top surface 35, and a bottom surface 33. As shown in FIG. 2, mounting surface 37 is a surface on which cutting edge member 20 is mounted. Mounting surface 37 faces cutting edge member 20. Mounting surface 37 may be in contact with cutting edge member 20. Mounting surface 37 is substantially parallel to rake face 22 of cutting edge member 20. First side surface 31 is continuous to mounting surface 37. When viewed in a direction perpendicular to third side surface 34, cutting edge member 20 is formed on mounting surface 27 and first side surface 31 is formed to extend upward relative to rake face 22 of cutting edge member 20. As shown in FIG. 2 and FIG. 3, second side surface 32 is located opposite to first side surface 31. A coolant supplying passage 40 is provided in mounting portion 30. Coolant supplying passage 40 opens in each of first side surface 31 and second side surface 32. As shown in FIG. 4, the opening of coolant supplying passage 40 in first side surface 31 constitutes a discharging opening 41 of coolant supplying passage 40. The opening of coolant supplying passage 40 in second side surface 32 constitutes an introduction opening 42 of coolant supplying passage 40.

As shown in FIG. 2 and FIG. 3, fastening screw insertion hole 50 is provided in mounting portion 30. Fastening screw insertion hole 50 opens in each of first side surface 31 and second side surface 32. Fastening screw insertion hole 50 includes: a first opening 51 that opens in first side surface 31; and a second opening 52 that opens in second side surface 32. Third side surface 34 is continuous to each of first side surface 31, second side surface 32, bottom surface 33, top surface 35, and mounting surface 37, for example. Cutting edge member 20 is disposed to protrude relative to mounting surface 37 so as to cross a plane along third side surface 34. Fourth side surface 36 is located opposite to third side surface 34. Cutting edge member 20 is separated from fourth side surface 36. Fourth side surface 36 is in contact with adjustment screw 80. Each of coolant supplying passage 40 and fastening screw insertion hole 50 is located between third side surface 34 and fourth side surface 36. Bottom surface 33 is located opposite to top surface 35. Bottom surface 33 is located opposite to mounting surface 37. Mounting surface 37 is located between a plane along bottom surface 33 and a plane along top surface 35. Bottom surface 33 is continuous to each of second side surface 32, third side surface 34, and fourth side surface 36. Top surface 35 is continuous to each of first side surface 31, second side surface 32, third side surface 34, and fourth side surface 36.

As shown in FIG. 4, coolant supplying passage 40 is constituted of a coolant reservoir portion 44 and an ejection passage 43, for example. Coolant reservoir portion 44 is continuous to introduction opening 42 of coolant supplying passage 40. Ejection passage 43 is continuous to discharging opening 41 of coolant supplying passage 40. As shown in FIG. 4, in a cross section (second cross section) parallel to rake face 22, coolant supplying passage 40 has a first side end portion 41a and a second side end portion 41b. Second side end portion 41b is opposite to first side end portion 41a. First side end portion 41a is located between second side end portion 41b and third side surface 34. From another viewpoint, first side end portion 41a is closer to third side surface 34 relative to second side end portion 41b. Second side end portion 41b is located between first side end portion 41a and fastening screw insertion hole 50. As shown in FIG. 4, in the second cross section, first side surface 31 is in the form of an arc, for example. First side surface 31 has a curvature radius R1 of 6.3 mm, for example.

As shown in FIG. 4, cutting edge 21 has a first cutting edge portion 21a, a second cutting edge portion 21b, and a corner cutting edge portion 21c. When viewed in a direction perpendicular to rake face 22, a straight line (first straight line La) extending along first side end portion 41a may cross first cutting edge portion 21a. Similarly, when viewed in the direction perpendicular to rake face 22, a straight line (second straight line Lb) extending along second side end portion 41b may cross second cutting edge portion 21b. First straight line La is substantially parallel to second straight line Lb. As shown in FIG. 4, first cutting edge portion 21a may extend along a direction parallel to third side surface 34. Second cutting edge portion 21b may extend in a direction parallel to second side surface 32. In the direction parallel to second cutting edge portion 21b, a distance between corner cutting edge portion 21c and first side end portion 41a may be more than or equal to 1.2 mm, for example.

Figure 5:
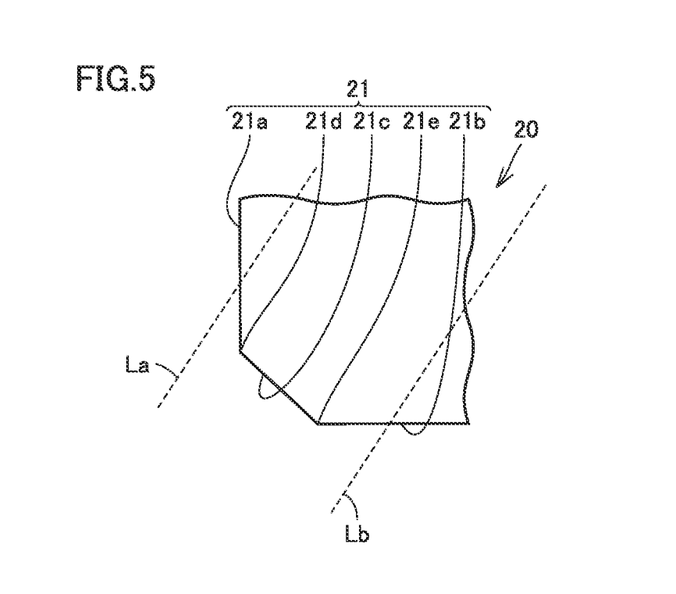
FIG. 5 is an enlarged schematic view of a region V of FIG. 4.

FIG. 5 is an enlarged schematic view of a region V in FIG. 4. As shown in FIG. 5, cutting edge 21 may further have corner cutting edge portion 21c. First cutting edge portion 21a is continuous to corner cutting edge portion 21c. Second cutting edge portion 21b is continuous to corner cutting edge portion 21c. Corner cutting edge portion 21c is continuous to each of first cutting edge portion 21a and second cutting edge portion 21b. A boundary between first cutting edge portion 21a and corner cutting edge portion 21c constitutes a first corner portion 21d. A boundary between second cutting edge portion 21b and corner cutting edge portion 21c constitutes a second corner portion 21e. As shown in FIG. 5, corner cutting edge portion 21c is inclined relative to each of first cutting edge portion 21a and second cutting edge portion 21b. As shown in FIG. 5, when viewed in the direction perpendicular to rake face 22, each of first corner portion 21d and second corner portion 21e may be located between first straight line La and second straight line Lb.

Figure 6:
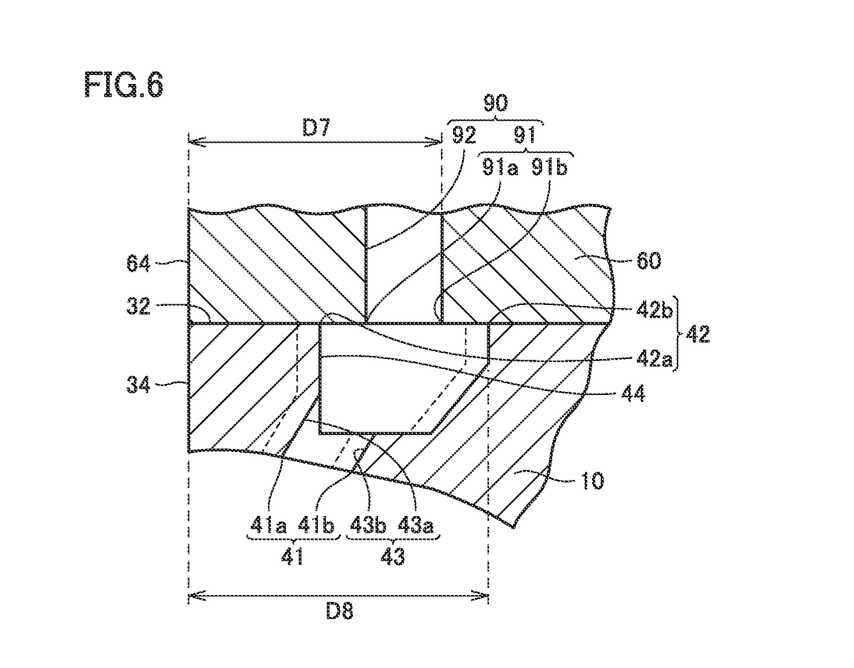
FIG. 6 is a schematic cross sectional view showing a configuration of a coolant supplying portion provided in a body.

FIG. 6 is a schematic cross sectional view showing a configuration of a coolant supplying portion 90 provided in body 60. As shown in FIG. 6, coolant supplying portion 90 is provided in body 60. Coolant supplying portion 90 provided in body 60 is continuous to introduction opening 42 of coolant supplying passage 40 provided in cutting insert 10. As shown in FIG. 6, in the cross section (second cross section) parallel to rake face 22, coolant supplying portion 90 has an outlet 91 and an inner wall surface 92. Outlet 91 has a first outlet portion 91a and a second outlet portion 91b. First outlet portion 91a is located between first end 64 of body 60 and second outlet portion 91b.

As shown in FIG. 6, the width of introduction opening 42 of coolant supplying passage 40 is larger than the width of outlet 91 of coolant supplying portion 90. From another viewpoint, outlet 91 of coolant supplying portion 90 is surrounded by introduction opening 42 of coolant supplying passage 40. Introduction opening 42 has a first introduction opening portion 42a and a second introduction opening portion 42b. First introduction opening portion 42a is located between second introduction opening portion 42b and third side surface 34. In the direction along second side surface 32, a distance (seventh distance D7) from first end 64 to second outlet portion 91b is shorter than a distance (eighth distance D8) from third side surface 34 to second introduction opening portion 42b. Accordingly, as indicated by broken lines of FIG. 6, even when cutting insert 10 is provided to be shifted relative to body 60 in the direction parallel to second side surface 32, coolant can be supplied from coolant supplying portion 90 of body 60 to coolant supplying passage 40 of cutting insert 10.

Figure 7:
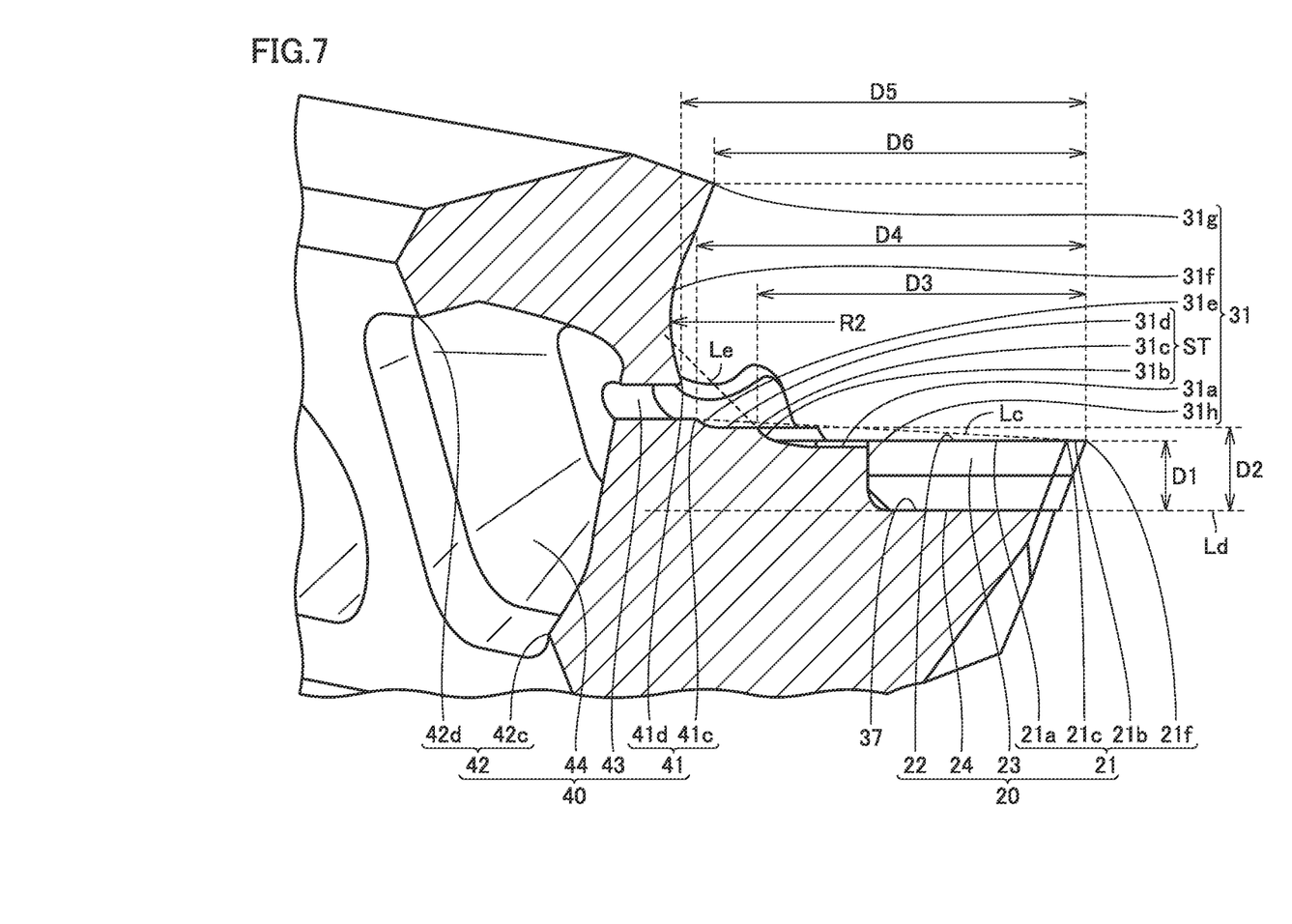
FIG. 7 is a schematic cross sectional view taken along a VII-VII line of FIG. 4.

FIG. 7 is a schematic cross sectional view along a VII-VII line of FIG. 4. The cross section shown in FIG. 7 is a cross section (first cross section) that is perpendicular to rake face 22 and that crosses each of introduction opening 42 and discharging opening 41. As shown in FIG. 7, first side surface 31 is provided with a step ST constituted of a rising portion 31b and a flat portion 31d. Flat portion 31d is continuous to rising portion 31b. Rising portion 31 is inclined relative to flat portion 31a. First side surface 31 further includes a side wall surface 31h, and a flat surface portion 31a. Side wall surface 31h is continuous to mounting surface 37. Side wall surface 31h extends substantially perpendicularly to mounting surface 37. Flat surface portion 31a is continuous to side wall surface 31h. Flat surface portion 31a extends substantially in parallel with mounting surface 37. Rising portion 31b is continuous to flat surface portion 31a. Rising portion 31b is inclined relative to flat surface portion 31a. Flat surface portion 31a is located between rising portion 31b and side wall surface 31h. Rising portion 31b is located between flat portion 31d and flat surface portion 31a.

As shown in FIG. 7, in the first cross section, first side surface 31 further has a curvature portion 31f continuous to flat portion 31d. Curvature portion 31f has a first end portion 31e continuous to flat portion 31d, and a second end portion 31g opposite to first end portion 31e. Discharging opening 41 is provided in curvature portion 31f. Discharging opening 41 is located between first end portion 31e and second end portion 31g. In the first cross section, discharging opening 41 has a first discharging opening portion 41d and a second discharging opening portion 41c. Second discharging opening portion 41c is located between first discharging opening portion 41d and a straight line (fourth straight line Ld) extending along mounting surface 37. First discharging opening portion 41d is close to second end portion 31g relative to second discharging opening portion 41c. Second discharging opening portion 41c is close to first end portion 31e relative to first discharging opening portion 41d.

As shown in FIG. 7, in the first cross section, a second distance D2 is longer than a first distance D1 when it is assumed that first distance D1 represents a distance between cutting edge 21 and mounting surface 37 in the direction perpendicular to rake face 22 and second distance D2 represents a distance between mounting surface 37 and a boundary portion 31c between rising portion 31b and flat portion 31d in the direction perpendicular to rake face 22. From another viewpoint, boundary portion 31c is provided at a location higher than rake face 22. A value obtained by subtracting first distance D1 from second distance D2 is more than or equal to 0.1 mm and less than or equal to 0.3 mm, for example. The value obtained by subtracting first distance D1 from second distance D2 may be more than or equal to 0.12 mm or may be more than or equal to 0.14 mm, for example. The value obtained by subtracting first distance D1 from second distance D2 may be less than or equal to 0.28 mm or may be less than or equal to 0.26 mm, for example.

As shown in FIG. 7, in the first cross section, a value obtained by dividing a third distance D3 by a fourth distance D4 is more than or equal to 0.5 and less than or equal to 0.8 when it is assumed that third distance D3 represents a distance between boundary portion 31c and tip 21f of cutting edge 21 in the direction parallel to rake face 22 and fourth distance D4 represents a distance between second discharging opening portion 41c and tip 21f of cutting edge 21 in the direction parallel to rake face 22. The value obtained by dividing third distance D3 by fourth distance D4 may be more than or equal to 0.53 or may be more than or equal to 0.56, for example. The value obtained by dividing third distance D3 by fourth distance D4 may be less than or equal to 0.77, or may be less than or equal to 0.74, for example. Third distance D3 is 3.5 mm, for example. Fourth distance D4 is 5.0 mm, for example.

As shown in FIG. 7, in the first cross section, a boundary portion 31c between rising portion 31b and flat portion 31d may be located between a straight line (third straight line Lc) passing through second discharging opening portion 41c and tip 21f of cutting edge 21 and a straight line (fourth straight line Ld) extending along mounting surface 37. From another viewpoint, in the direction perpendicular to rake face 22, boundary portion 31c may be located between second discharging opening portion 41c and cutting edge 21. In the first cross section, first discharging opening portion 41d may be located between a straight line (fifth straight line Le) extending along rising portion 31b and the straight line (fourth straight line Ld) extending along mounting surface 37. From another viewpoint, fifth straight line Le may extend to cross a line segment that connects first discharging opening portion 41d to second end portion 31g.

As shown in FIG. 7, in the first cross section, a fifth distance D5 may be longer than fourth distance D4 when it is assumed that fifth distance D5 represents a distance between first discharging opening portion 41d and tip 21f of cutting edge 21 in the direction parallel to rake face 22. From another viewpoint, in the direction parallel to rake face 22, second discharging opening portion 41c may be close to tip 21f of cutting edge 21 relative to first discharging opening portion 41d. From another viewpoint, in a direction in which the coolant flows, second discharging opening portion 41c may be located forward relative to first discharging opening portion 41d. Rake face 22 may be parallel to the extending direction of ejection passage 43.

As shown in FIG. 7, in the first cross section, a sixth distance D6 may be shorter than fifth distance D5 when it is assumed that sixth distance D6 represents a distance between second end portion 31g and tip 21f of cutting edge 21 in the direction parallel to rake face 22. Sixth distance D6 may be shorter than fourth distance D4. From another viewpoint, in the direction in which the coolant flows, second end portion 31g may be located forward relative to first end portion 31e. From another viewpoint, when viewed in the direction perpendicular to rake face 22, curvature portion 31f may protrude toward the tip 21f side of cutting edge 21 so as to cover the discharging portion. In the first cross section, curvature portion 31f has a curvature radius R2 of 2.5 mm, for example.

Figure 8:
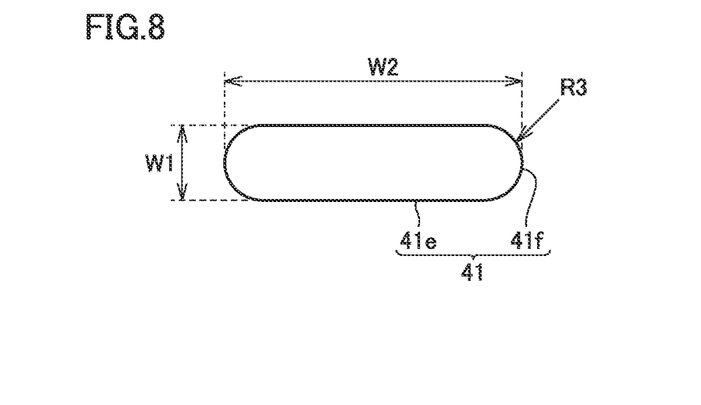
FIG. 8 is a schematic front view showing a configuration of a discharging opening of a coolant supplying passage.

FIG. 8 is a schematic front view showing a configuration of discharging opening 41 of coolant supplying passage 40. As shown in FIG. 8, when discharging opening 41 is viewed from the front of discharging opening 41, width W2 of discharging opening 41 in the direction parallel to rake face 22 is larger than width W1 of discharging opening 41 in the direction perpendicular to rake face 22. Width W1 of discharging opening 41 in the direction perpendicular to rake face 22 is 0.5 mm, for example. Width W2 of discharging opening 41 in the direction parallel to rake face 22 is 1.6 mm, for example. Discharging opening 41 is constituted of straight line portions 41e and arc portions 41f, for example. Each of arc portions 41f has a curvature radius of 0.25 mm, for example. The cross sectional area of coolant supplying portion 90 may be smaller than the maximum cross sectional area of coolant reservoir portion 44 (see FIG. 4) and may be larger than the cross sectional area of ejection passage 43 (see FIG. 4). The cross sectional area of ejection passage 43 is less than or equal to 1 mm$^2$, for example. The cross sectional area of ejection passage 43 may be less than or equal to 0.9 mm$^2$, or may be less than or equal to 0.8 mm$^2$, for example. Here, the term "cross sectional area" refers to an area in the cross section perpendicular to the direction in which the coolant flows.

Figure 9:
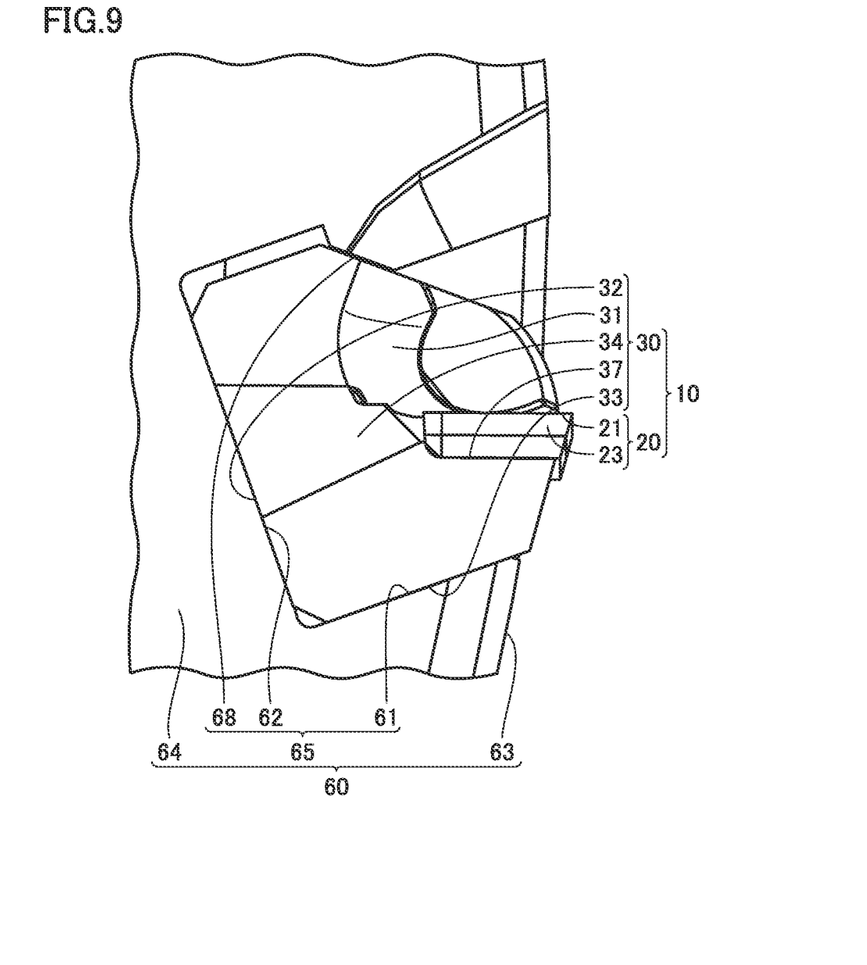
FIG. 9 is a schematic plan view showing a state in which the cutting insert is attached to the body.

FIG. 9 is a schematic plan view showing a state in which cutting insert 10 is attached to body 60. As shown in FIG. 9, insert attachment portion 65 of body 60 has a first seating surface 61, a second seating surface 62, and an escaping prevention surface 68. First seating surface 61 is continuous to outer circumferential surface 63. First seating surface 61 is inclined relative to a tangent line of outer circumferential surface 63. Second seating surface 62 is continuous to first seating surface 61. Second seating surface 62 is inclined relative to first seating surface 61. Each of first seating surface 61, second seating surface 62, and escaping prevention surface 68 is continuous to first end 64. Bottom surface 33 of cutting insert 10 is in contact with first seating surface 61. Second side surface 32 of cutting insert 10 is in contact with second seating surface 62. Top surface 35 of cutting insert 10 faces escaping prevention surface 68. With escaping prevention surface 68, cutting insert 10 can be prevented from being detached and escaped from body 60. Outlet 91 of coolant supplying portion 90 of body 60 is provided in second seating surface 62.

Next, the following describes function and effect of milling tool 1 and cutting insert 10 according to the present embodiment.

Figure 10:
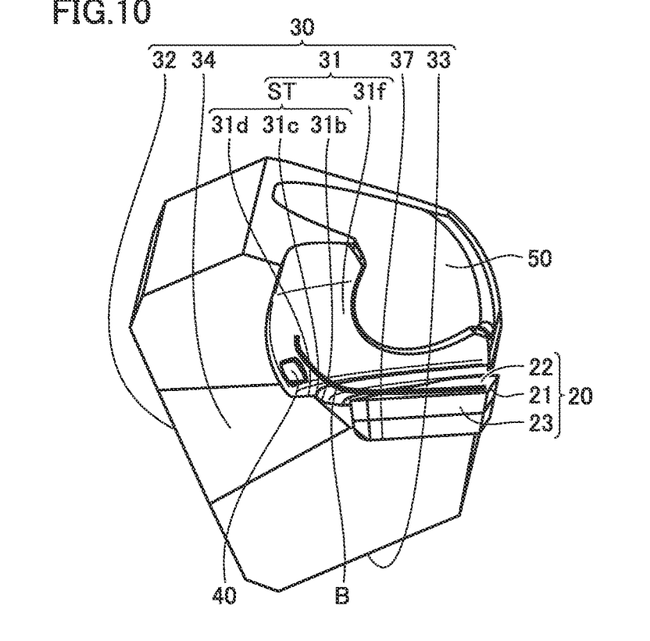
FIG. 10 is a first schematic perspective view for illustrating function and effect of the milling tool and the cutting insert according to the present embodiment.

FIG. 10 is a first schematic perspective view for illustrating function and effect of milling tool 1 and cutting insert 10 according to the present embodiment. As shown in FIG. 10, swarf B moves from cutting edge 21 toward first side surface 31. According to milling tool 1 and cutting insert 10 according to the present embodiment, boundary portion 31c between rising portion 31b and flat portion 31d is disposed at a location higher than rake face 22. Therefore, the direction of swarf B, which moves along rake face 22, is changed by step ST constituted of rising portion 31b and flat portion 31d such that swarf B passes through the location higher than rake face 22. Therefore, swarf B can be suppressed from moving toward coolant supplying passage 40. Therefore, coolant supplying passage 40 can be suppressed from being blocked by swarf B. Here, swarf B can block coolant supplying passage 40 in the following manners: swarf B directly enters coolant supplying passage 40; and swarf B is brought into abutment with a portion of first side surface 31 below coolant supplying passage 40 to cause gradual accumulation of swarf B welded to that portion, with the result that coolant supplying passage 40 is blocked.

Moreover, according to milling tool 1 and cutting insert 10 according to the present embodiment, the value obtained by dividing third distance D3 by fourth distance D4 is more than or equal to 0.5 and less than or equal to 0.8 when it is assumed that third distance D3 represents the distance between boundary portion 31c and tip 21f of cutting edge 21 in the direction parallel to rake face 22 and fourth distance D4 represents a distance between second discharging opening portion 41c and tip 21f of cutting edge 21 in the direction parallel to rake face 22. Accordingly, swarf B is drawn to near first side surface 31 and the direction of swarf B is then changed by step ST constituted of rising portion 31b and flat portion 31d. Therefore, swarf B can be curled readily by first side surface 31. As a result, swarf B can be divided effectively.

Further, according to milling tool 1 and cutting insert 10 according to the present embodiment, in the first cross section, first discharging opening portion 41d may be located between a straight line extending along rising portion 31b and a straight line extending along mounting surface 37. Accordingly, the direction of swarf B is changed such that swarf B moves to above first discharging opening portion 41d. Accordingly, swarf B can be suppressed from entering coolant supplying passage 40. Therefore, coolant supplying passage 40 can be further suppressed from being blocked by swarf B.

Further, according to milling tool 1 and cutting insert 10 according to the present embodiment, in the first cross section, first side surface 31 may have a curvature portion 31f continuous to flat portion 31d. Accordingly, swarf B can be curled effectively. As a result, swarf B can be divided effectively.

Further, according to milling tool 1 and cutting insert 10 according to the present embodiment, in the first cross section, curvature portion 31f may have a first end portion 31e continuous to flat portion 31d and a second end portion 31g opposite to first end portion 31e, and a sixth distance D6 may be shorter than fifth distance D5 when it is assumed that sixth distance D6 represents a distance between second end portion 31g and tip 21f of cutting edge 21 in the direction parallel to rake face 22. Accordingly, swarf B can be curled more effectively. As a result, swarf B can be divided more effectively. Moreover, swarf B can be suppressed from coming into contact with body 60.

Further, according to milling tool 1 and cutting insert 10 according to the present embodiment, cutting edge 21 may have a first cutting edge portion 21a, a corner cutting edge portion 21c continuous to first cutting edge portion 21a, and a second cutting edge portion 21b continuous to corner cutting edge portion 21c. A boundary between first cutting edge portion 21a and corner cutting edge portion 21c may constitute a first corner portion 21d. A boundary between second cutting edge portion 21b and corner cutting edge portion 21c may constitute a second corner portion 21e. When it is assumed that a second cross section represents a cross section parallel to rake face 22, in the second cross section, coolant supplying passage 40 may have a first side end portion 41a and a second side end portion 41b opposite to first side end portion 41a, and each of first corner portion 21d and second corner portion 21e may be located between a straight line extending along first side end portion 41a and a straight line extending along second side end portion 41b. Accordingly, the coolant can be supplied effectively to the vicinity of corner cutting edge portion 21c. As a result, swarf B can be suppressed from being caught in the workpiece while dividing swarf B effectively.

Further, according to milling tool 1 and cutting insert 10 according to the present embodiment, a width of discharging opening 41 in the direction parallel to rake face 22 may be larger than a width of discharging opening 41 in the direction perpendicular to rake face 22. Accordingly, cutting edge 21 can be cooled in a wide range.

Further, according to milling tool 1 and cutting insert 10 according to the present embodiment, coolant supplying passage 40 may be constituted of a coolant reservoir portion 44 and an ejection passage 43, coolant reservoir portion 44 being continuous to introduction opening 42, ejection passage 43 being continuous to each of coolant reservoir portion 44 and discharging opening 41. A cross sectional area of coolant supplying portion 90 may be smaller than a maximum cross sectional area of coolant reservoir portion 44 and may be larger than a cross sectional area of ejection passage 43. Since the cross sectional area of coolant supplying portion 90 is made smaller than the maximum cross sectional area of coolant reservoir portion 44, coolant supplying portion 90 of body 60 is covered by coolant supplying passage 40 of cutting insert 10 even in the case where the cutting edge of cutting insert 10 is shifted forward relative to body 60 when the cutting edge of cutting insert 10 is worn, whereby the coolant can be supplied from body 60 to coolant supplying passage 40 of cutting insert 10. Moreover, by making the cross sectional area of ejection passage 43 smaller than the maximum cross sectional area of coolant reservoir portion 44, the coolant can be exactly supplied to the cutting edge even during high-speed rotation. Moreover, the effect of dividing swarf B can be improved. Further, even with a small amount of supply of coolant, the coolant can be supplied to the cutting edge at a high pressure.

Further, according to milling tool 1 and cutting insert 10 according to the present embodiment, a cross sectional area of ejection passage 43 may be less than or equal to 1 mm². Accordingly, the coolant can be supplied to the cutting edge at a higher pressure.

Figure 11:
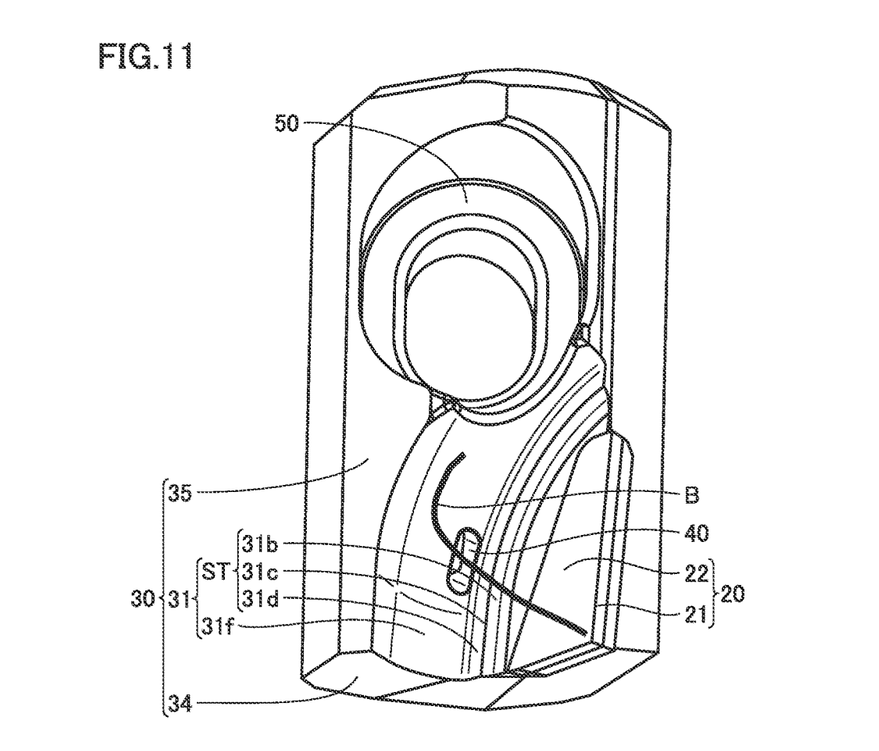
FIG. 11 is a second schematic perspective view for illustrating function and effect of the milling tool and the cutting insert according to the present embodiment.

FIG. 11 is a second schematic perspective view for illustrating function and effect of milling tool 1 and cutting insert 10 according to the present embodiment. As shown in FIG. 4, in the plane parallel to rake face 22, first side surface 31 of cutting insert 10 has a curvature. Accordingly, swarf B is curled by first side surface 31 in the direction substantially perpendicular to rake face 22, and is also curled in the direction parallel to rake face 22 (see FIG. 11). Accordingly, swarf B is divided more effectively.

(Discharging Opening of Coolant Supplying Passage)

Next, configurations of modifications of discharging opening 41 of coolant supplying passage 40 will be described.

Figure 12:
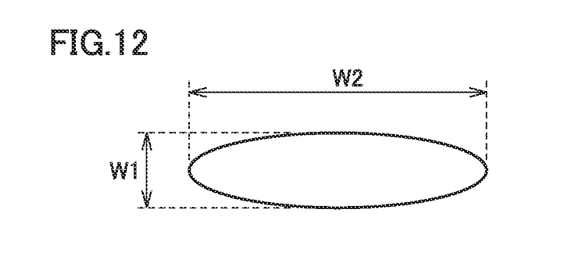
FIG. 12 is a schematic view showing a configuration of a discharging opening of a coolant supplying passage of a cutting insert according to a first modification.

FIG. 12 is a schematic view showing a configuration of discharging opening 41 of coolant supplying passage 40 of cutting insert 10 according to a first modification. As shown in FIG. 12, discharging opening 41 of coolant supplying passage 40 may be configured to have an elliptical shape. In this case, width W2 of discharging opening 41 in the direction parallel to rake face 22 is the width of the long axis of the elliptical shape. Moreover, width W1 of discharging opening 41 in the direction perpendicular to rake face 22 is the width of the short axis of the elliptical shape.

Figure 13:
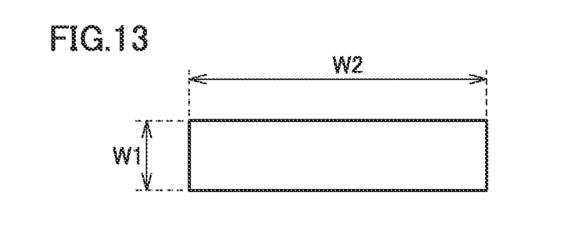
FIG. 13 is a schematic view showing a configuration of a discharging opening of a coolant supplying passage of a cutting insert according to a second modification.

FIG. 13 is a schematic view showing a configuration of discharging opening 41 of coolant supplying passage 40 of cutting insert 10 according to a second modification. As shown in FIG. 13, discharging opening 41 of coolant supplying passage 40 may be configured to have a rectangle shape. In this case, width W2 of discharging opening 41 in the direction parallel to rake face 22 is the width of the long side of the rectangular shape. Moreover, width W1 of discharging opening 41 in the direction perpendicular to rake face 22 is the width of the short side of the rectangular shape.

Figure 14:
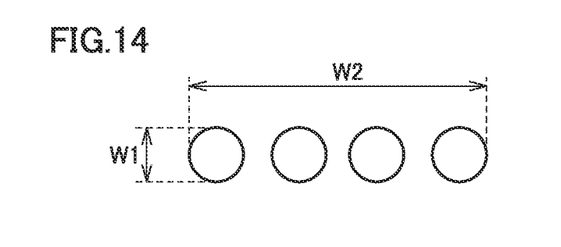
FIG. 14 is a schematic view showing a configuration of a discharging opening of a coolant supplying passage of a cutting insert according to a third modification.

FIG. 14 is a schematic view showing a configuration of discharging opening 41 of coolant supplying passage 40 of cutting insert 10 according to a third modification. As shown in FIG. 14, discharging opening 41 of coolant supplying passage 40 may be constituted of a plurality of circles. Specifically, the plurality of circles may be disposed at a certain interval therebetween in the direction parallel to rake face 22. The number of the circles is not particularly limited, and four circles may be provided, for example. In this case, width W2 of discharging opening 41 in the direction parallel to rake face 22 corresponds to a distance from an end portion of a circle disposed at one side to an end portion of a circle disposed at the other side in the direction parallel to rake face 22. Moreover, width W1 of discharging opening 41 in the direction perpendicular to rake face 22 corresponds to the diameter of each of the circles.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: milling tool; 10: cutting insert; 20: cutting edge member; 21: cutting edge; 21a: first cutting edge portion; 21b: second cutting edge portion; 21c: corner cutting edge portion; 21d: first corner portion; 21e: second corner portion; 21f: tip; 22: rake face; 23: flank face; 23a: first flank face portion; 23b: second flank face portion; 30: mounting portion; 31: first side surface; 31a: flat surface portion; 31b: rising portion; 31c: boundary portion; 31d: flat portion; 31e: first end portion; 31f: curvature portion; 31g: second end portion; 31h: side wall surface; 32: second side surface; 33: bottom surface; 34: third side surface; 35: top surface; 36: fourth side surface; 37: mounting surface; 40: coolant supplying passage; 41: discharging opening; 41a: first side end portion; 41b: second side end portion; 41c: second discharging opening portion; 41d: first discharging opening portion; 41e: straight line portion; 41f: arc portion; 42: introduction opening; 42a: first introduction opening portion; 42b: second introduction opening portion; 43: ejection passage; 44: coolant reservoir portion; 50: fastening screw insertion hole; 51: first opening; 52: second opening; 60: body; 61: first seating surface; 62: second seating surface; 63: outer circumferential surface; 64: first end; 65: insert attachment portion; 66: second end; 67: through hole; 68: prevention surface; 80: adjustment screw; 81: fastening screws; 90: coolant supplying portion; 91: outlet; 91a: first outlet portion; 91b: second outlet portion; 92: inner wall surface; A: center axis; B: swarf; D1: first distance; D2: second distance; D3: third distance; D4: fourth distance; D5: fifth distance; D6: sixth distance; D7: seventh distance; D8: eighth distance; La: first straight line; Lb: second straight line; Lc: third straight line; Ld: fourth straight line; Le: fifth straight line; R1, R2: curvature radius; ST: step; W1, W2: width.

The invention claimed is:

1. A cutting insert comprising:

a cutting edge member; and a mounting portion on which the cutting edge member is mounted, wherein the cutting edge member includes a rake face and a flank face continuous to the rake face, and a ridgeline between the rake face and the flank face constitutes a cutting edge, the mounting portion includes a mounting surface on which the cutting edge member is mounted, a first side surface continuous to the mounting surface, and a second side surface opposite to the first side surface, the mounting portion is provided with a coolant supplying passage that opens in each of the first side surface and the second side surface, an opening of the coolant supplying passage in the first side surface constitutes a discharging opening of the coolant supplying passage, an opening of the coolant supplying passage in the second side surface constitutes an introduction opening of the coolant supplying passage, the first side surface is provided with a step constituted of a rising portion and a flat portion continuous to the rising portion, when it is assumed that a first cross section represents a cross section that is perpendicular to the rake face and that crosses each of the introduction opening and the discharging opening, the discharging opening has a first discharging opening portion and a second discharging opening portion in the first cross section, the second discharging opening portion being located between the first discharging opening portion and a straight line extending along the mounting surface, and a second distance is longer than a first distance and a value obtained by dividing a third distance by a fourth distance is more than or equal to 0.5 and less than or equal to 0.8 when it is assumed that the first distance represents a distance between the cutting edge and the mounting surface in a direction perpendicular to the rake face, the second distance represents a distance between the mounting surface and a boundary portion between the rising portion and the flat portion in the direction perpendicular to the rake face, the third distance represents a distance between the boundary portion and a tip of the cutting edge in a direction parallel to the rake face, and the fourth distance represents a distance between the second discharging opening portion and the tip of the cutting edge in the direction parallel to the rake face.

2. The cutting insert according to claim 1, wherein in the first cross section, the boundary portion is located between a straight line passing through the second discharging opening portion and the tip of the cutting edge and a straight line extending along the mounting surface.

3. The cutting insert according to claim 1, wherein a value obtained by subtracting the first distance from the second distance is more than or equal to 0.1 mm and less than or equal to 0.3 mm.

4. The cutting insert according to claim 1, wherein in the first cross section, the first discharging opening portion is located between a straight line extending along the rising portion and a straight line extending along the mounting surface.

5. The cutting insert according to claim 1, wherein in the first cross section, the first side surface has a curvature portion continuous to the flat portion.

6. The cutting insert according to claim 5, wherein in the first cross section, a fifth distance is longer than the fourth distance when it is assumed that the fifth distance represents a distance between the first discharging opening portion and the tip of the cutting edge in the direction parallel to the rake face.

7. The cutting insert according to claim 6, wherein in the first cross section, the curvature portion has a first end portion continuous to the flat portion and a second end portion opposite to the first end portion, and a sixth distance is shorter than the fifth distance when it is assumed that the sixth distance represents a distance between the second end portion and the tip of the cutting edge in the direction parallel to the rake face.

8. The cutting insert according to claim 1, wherein the cutting edge has a first cutting edge portion, a corner cutting edge portion continuous to the first cutting edge portion, and a second cutting edge portion continuous to the corner cutting edge portion, a boundary between the first cutting edge portion and the corner cutting edge portion constitutes a first corner portion, a boundary between the second cutting edge portion and the corner cutting edge portion constitutes a second corner portion, and when it is assumed that a second cross section represents a cross section parallel to the rake face, in the second cross section, the coolant supplying passage has a first side end portion and a second side end portion opposite to the first side end portion, and each of the first corner portion and the second corner portion is located between a straight line extending along the first side end portion and a straight line extending along the second side end portion.

9. The cutting insert according to claim 8, wherein a width of the discharging opening in the direction parallel to the rake face is larger than a width of the discharging opening in the direction perpendicular to the rake face.

10. A milling tool comprising:

the cutting insert recited in claim 1; and a body to which the cutting insert is attached, wherein a coolant supplying portion continuous to the introduction opening is provided in the body.

11. The milling tool according to claim 10, wherein the coolant supplying passage is constituted of a coolant reservoir portion and an ejection passage, the coolant reservoir portion being continuous to the introduction opening, the ejection passage being continuous to each of the coolant reservoir portion and the discharging opening, and a cross sectional area of the coolant supplying portion is smaller than a maximum cross sectional area of the coolant reservoir portion and is larger than a cross sectional area of the ejection passage.

12. The milling tool according to claim 11, wherein a cross sectional area of the ejection passage is less than or equal to 1 mm$^2$.

13. The milling tool according to claim 11, wherein the rake face is parallel to an extending direction of the ejection passage.

* * * * *